United States Patent
Bourgeois

[19]

[11] Patent Number: 5,970,852
[45] Date of Patent: *Oct. 26, 1999

[54] GAS FIRED OUTDOOR COOKING APPARATUS FOR SELECTIVELY BOILING OR STEAMING FOOD ITEMS

[75] Inventor: Norman Bourgeois, Jefferson, La.

[73] Assignee: Metal Fusion, Inc., Jefferson, La.

[ * ] Notice: This patent is subject to a terminal disclaimer.

[21] Appl. No.: 09/149,842

[22] Filed: Sep. 8, 1998

Related U.S. Application Data

[63] Continuation of application No. 08/813,463, Mar. 10, 1997, Pat. No. 5,813,321.

[51] Int. Cl.$^6$ ............... A47J 37/00; A47J 37/04; A47J 43/18
[52] U.S. Cl. ............... 99/340; 99/413; 99/419; 99/426; 99/450; 99/482; 126/30; 126/40
[58] Field of Search ............. 99/339, 340, 345, 99/426, 403–418, 419–421 V, 444–450, 481, 482; 126/41 R, 25 R, 40, 30, 9 R; 426/523

[56] References Cited

U.S. PATENT DOCUMENTS

| | | | |
|---|---|---|---|
| 3,053,169 | 9/1962 | Rappaport | 99/421 |
| 3,583,307 | 6/1971 | Lee, Sr. | 99/446 X |
| 4,420,493 | 12/1983 | Greck | 99/419 X |
| 4,450,759 | 5/1984 | Steibel | 99/426 X |
| 4,735,135 | 4/1988 | Walker | 99/424 |
| 4,945,824 | 8/1990 | Borgmann | 99/403 |
| 5,065,735 | 11/1991 | Bourgeois et al. . | |
| 5,106,642 | 4/1992 | Ciofalo | 426/509 |
| 5,301,602 | 4/1994 | Ryezek | 99/345 |
| 5,431,092 | 7/1995 | Guillory | 99/410 |
| 5,442,999 | 8/1995 | Meister | 99/426 |
| 5,531,154 | 7/1996 | Perez, III | 99/340 |
| 5,575,198 | 11/1996 | Lowery | 99/426 |
| 5,586,489 | 12/1996 | Fraga | 99/421 H |
| 5,662,028 | 9/1997 | Fraga | 99/448 |
| 5,665,258 | 9/1997 | Hsu | 99/421 P |
| 5,673,611 | 10/1997 | Tieman | 99/449 X |
| 5,813,321 | 9/1998 | Bourgeois | 99/340 |

FOREIGN PATENT DOCUMENTS

| | | |
|---|---|---|
| 217592 | 3/1961 | Austria . |
| 2 685 862 | 7/1993 | France . |
| 2 205 734 | 12/1988 | United Kingdom . |

*Primary Examiner*—Timothy Simone
*Attorney, Agent, or Firm*—Garvey, Smith, Nehrbass & Doody, LLC

[57] ABSTRACT

A cooking apparatus enables a user to cook either by steaming or by boiling. The apparatus includes a burner having a base that is specially shaped to cradle a pot. An upper ring extends above the support surface of the burner for engaging the sidewall of the pot should the pot be tipped inadvertently. A removable basket fits the pot interior, the basket having a base that registers against the bottom of the pot and a vertically extending portion that includes hooks for receiving a bail that can then removably attach to the basket at the periphery of the pot. The burner includes an upper ring member that is supported above the bottom of the pot and a lower ring member that engages an underlying supporting ground surface. Struts extend between the rings are shaped and cradle the bottom of the pot and its sidewall respectively. A steamer plate can be removably attached to the basket at a position generally in between the top and bottom of the basket, the plate having an array of openings therethrough for enabling steam to travel through the openings to engage a food product contained on the upper surface of the plate. When the plate is removed, the support can be used to hold a poultry item during boiling or frying, such as a chicken, turkey, etc.

15 Claims, 4 Drawing Sheets

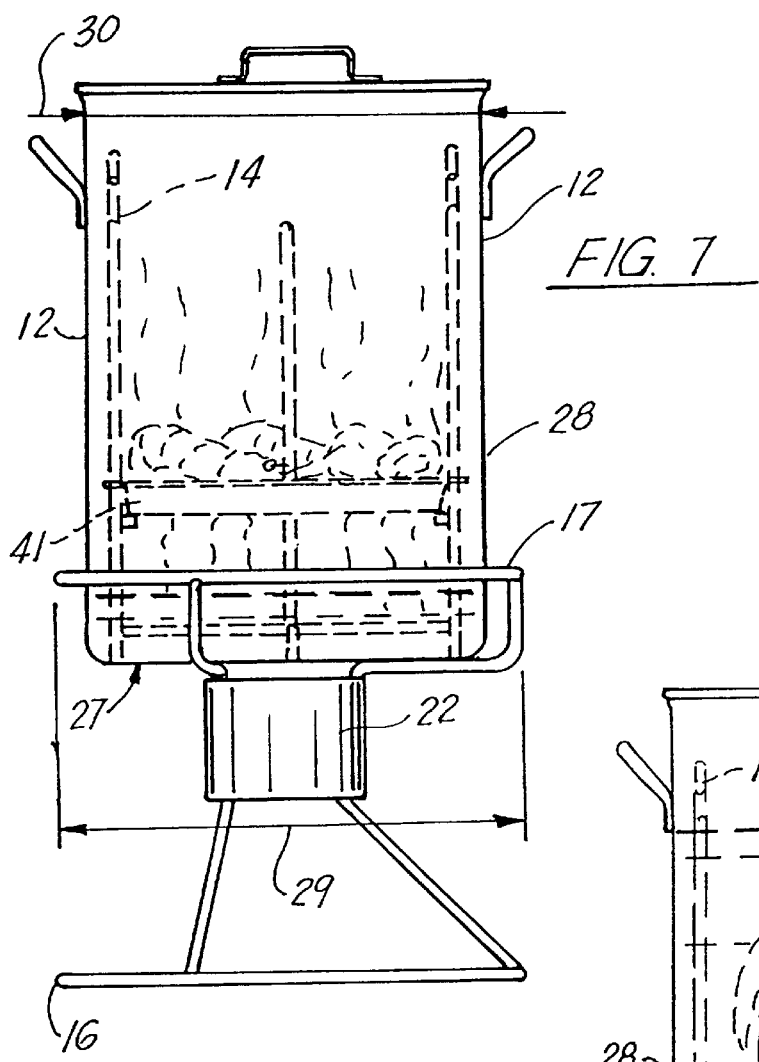
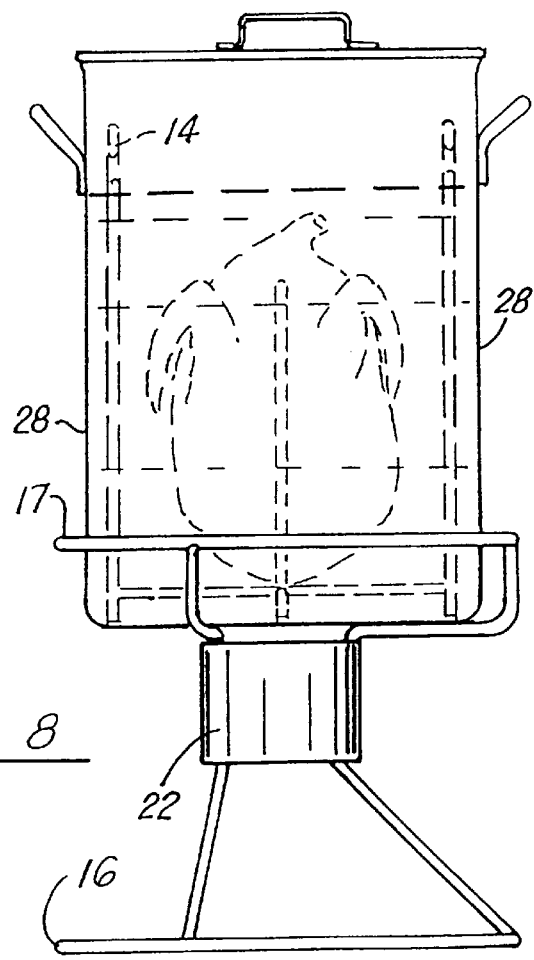

GAS FIRED OUTDOOR COOKING APPARATUS FOR SELECTIVELY BOILING OR STEAMING FOOD ITEMS

CROSS-REFERENCE TO RELATED APPLICATIONS

This is a continuation of application Ser. No. 08/813,463, filed Mar. 10, 1997, now U.S. Pat. No. 5,813,321.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices and cooking accessories and more particularly to a natural gas fired outdoor cooker that is supplied with a source of fuel such as butane from a canister and that includes a stand, pot, and insert, the improvement including a special configuration of the burner that envelopes the lower end portion of the pot and a combination fryer/steamer apparatus that can be lowered into the pot so that the user can steam vegetables, seafood, shellfish and the like or remove a specially configured steamer plate when frying or boiling food items such as poultry, shellfish, etc. 2. General Background of the Invention A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters.

Examples of these prior art type outdoor cooking devices can be seen in the Jan. 1, 1996 brochure of Metal Fusion, Inc., of Jefferson, La.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 9OPK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are appertured longitudinally for receiving a knife to cut food within the tube member.

One of the problems with outdoor cookers is flexibility. The user desirably wants a cooking device that can be used to accomplish multiple tasks. For example, many of the commercial available cooking arrangements for frying or boiling food are not satisfactory when the user wants to steam seafood.

BRIEF SUMMARY OF THE INVENTION

The present invention solves these prior art problems and shortcomings by providing an outdoor cooking apparatus featuring a combination cooking/steaming arrangement that enables a user to either fry food items in hot oil, or steam items with boiling water by simply rearranging components of a basket that is lowered into the pot.

The present invention includes a burner frame having a base for engaging an underlying support surface, the burner having a nozzle for generating a high intensity flame for use in cooking, and a supply hose for supplying propane to the burner. The burner frame has a support surface for cradling a pot.

A pot is provided that includes a flat bottom portion and cylindrically-shaped continuous side walls, the pot having a generally cylindrically-shaped interior for receiving a basket. The basket removably fits the pot interior, the basket having a base that registers against the bottom of the pot and a vertically extending portion adjacent to the pot wall that removably connects to a bail. The burner frame includes a ring that is supported above the bottom of the pot on the exterior of the pot for engaging the sidewall of the pot should the pot be tipped.

The upper ring is supported by a plurality of generally "ell" shaped struts that extend from the upper ring downwardly along a generally vertical path and then horizontally to cradle the bottom of the pot.

A removable steamer plate can be attached to the basket at a position generally in between the bottom of the basket and the top of the basket, thus suspending the plate well above the bottom portion of the pot where boiling water can generate steam.

The steamer plate provides an array of openings therethrough for enabling steam to travel through the openings to engage a food product (or products) contained on the upper surface of the plate. The steamer plate enables a user to steam shellfish, seafood, vegetables and the like.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein:

FIG. 7 is a sectional elevational view of the preferred embodiment of the apparatus of the present invention illustrating the burner, pot, and basket portions thereof during steaming; and FIG. 8 is a sectional elevational view of the preferred embodiment of the apparatus of the present invention illustrating the burner, pot, and basket portions thereof during boiling.

DETAILED DESCRIPTION OF THE INVENTION

Figure 1:
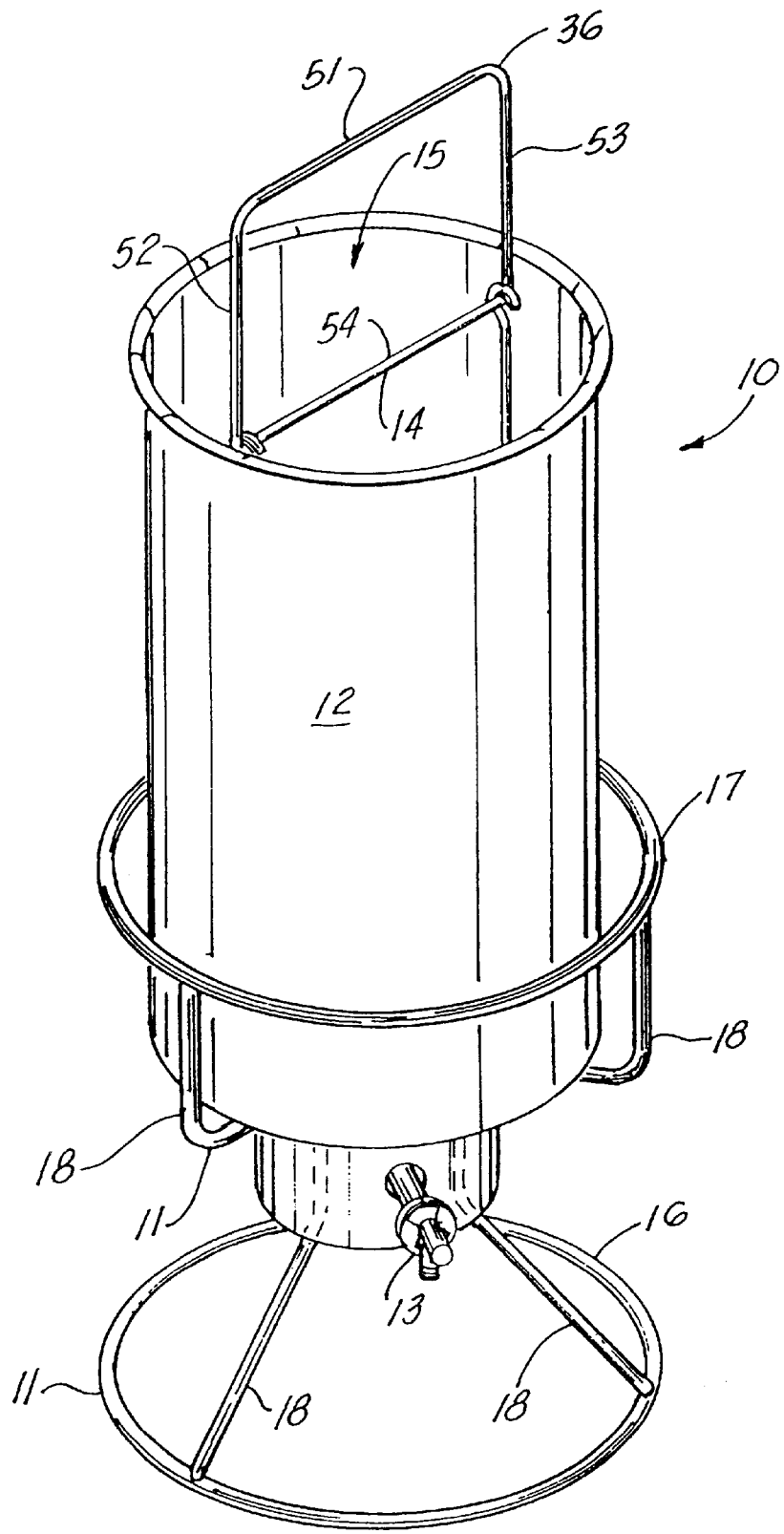
FIG. 1 is a perspective view of the preferred embodiment of the apparatus of the present invention.

The present invention provides an outdoor cooking apparatus designated generally by the numeral 10 in FIG. 1. The apparatus 10 includes a burner 11, pot 12, supply valve 13, and flexible hose 13 for supplying propane for firing the burner 11, and a basket 14 (see FIGS. 2–3) that can be lowered into the interior 15 of pot 12. In FIGS. 4–8, burner 11 includes a lower ring 16 and an upper ring 17. Burner 11 has a nozzle surrounded by cylindrically-shaped wind guard 22.

The rings 16, 17 are connected with a plurality of struts. Each strut 18 includes radially extending, inclined lower strut section 19, upper strut section 20, and vertical center strut section 21. Each of the lower strut sections 19 is linear in shape, and inclined to form a connection between the lower or base ring 16 and the bottom of central strut section 20 (see FIG. 6).

Upper strut sections 20 are generally "ell" shaped having a lower end portion 23 that forms a connection with the upper end of central strut section 21 and an upper end 24 that forms a connection with upper ring 17.

The "ell" shaped upper strut sections 20 include upper linear section 24, lower linear section 23, and bend sections 25, 26. This configuration provides both a base for holding the bottom surface 27 of pot 12 and a vertically extending portion that envelopes the lower end of pot sidewall 28.

Figure 4:
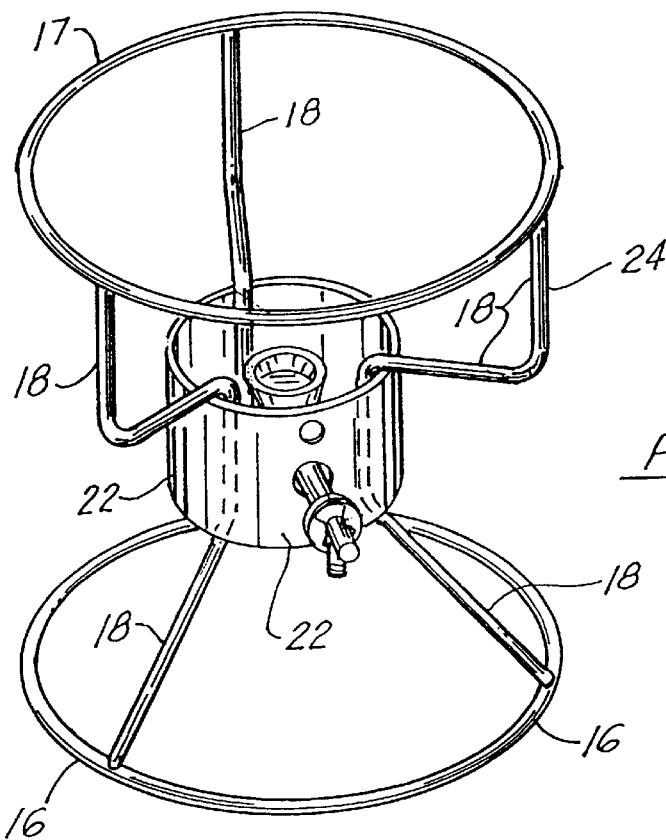
FIG. 4 is a fragmentary perspective view of the preferred embodiment of the apparatus of the present invention illustrating the burner portion thereof.
Figure 5:
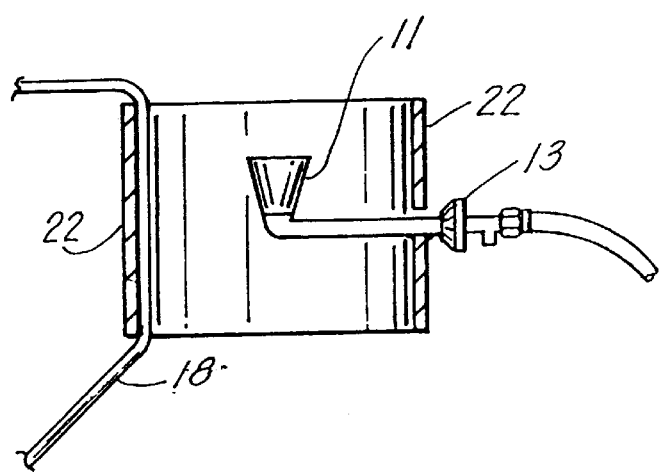
FIG. 5 is a fragmentary sectional elevational view of the burner of FIG. 4.
Figure 6:
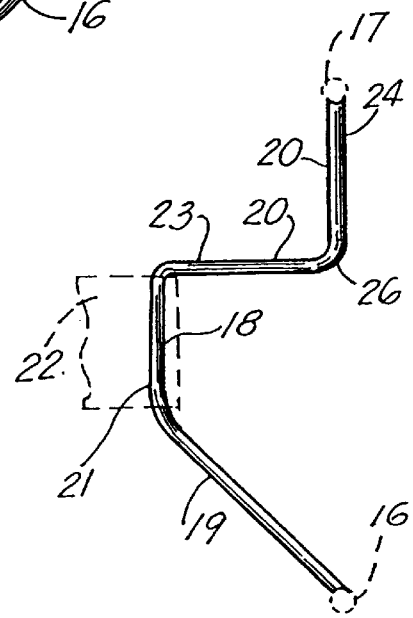
FIG. 6 is a fragmentary sectional elevational view of the burner of FIG. 4.

In the preferred embodiment, the ring 17 is positioned about__inches above the bottom surface 27 of pot 12. Further, the upper ring 17 has an inside diameter indicated as 29 in FIG. 4 that closely approaches the outside diameter 30 of pot 12, as indicated in FIG. 4. A clearance of about ½–½ inches is provided in between the inside of ring 17 and the outside of pot wall 28 during use.

Figure 2:
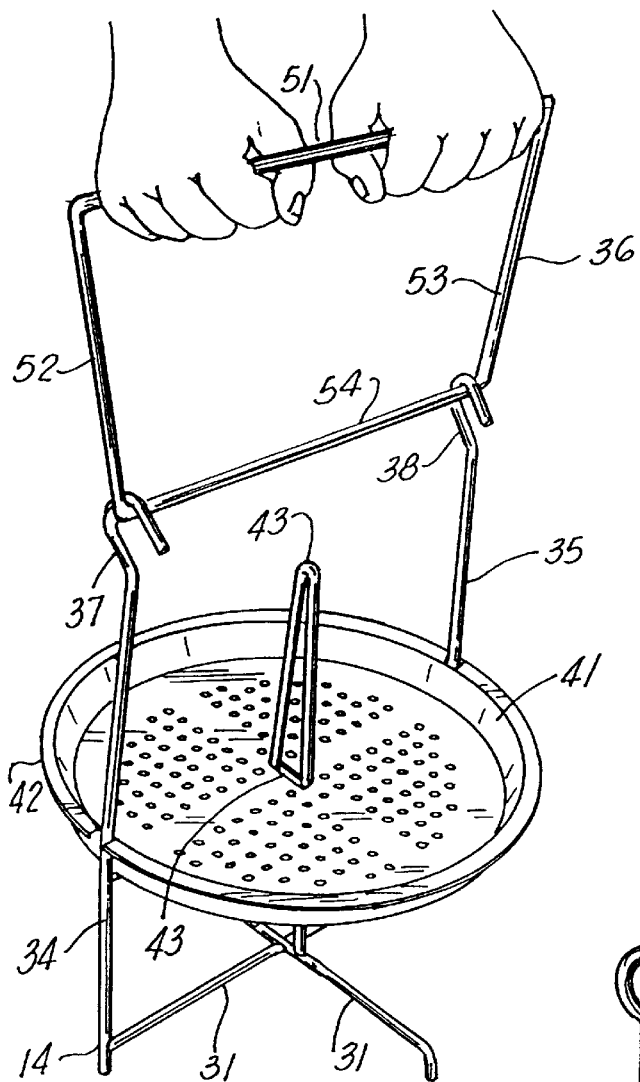
FIG. 2 is a partial perspective view of the preferred embodiment of the apparatus of the present invention illustrating the basket, steam plate, and bail.
Figure 3:
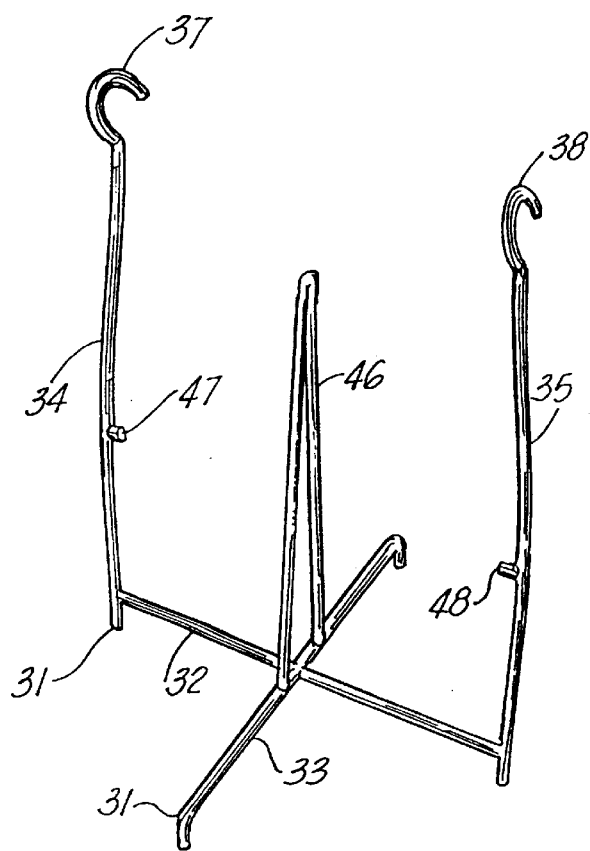
FIG. 3 is a partial perspective of the preferred embodiment of the apparatus of the present invention illustrating the basket portion thereof.

In FIGS. 1–3, basket 14 includes a wire basket frame 31 that can be, for example, in the form of a plurality of connected (e.g., welded) wire members arranged in a cross (see FIG. 3).

In FIGS. 2–3, basket 14 includes a base comprised of a pair of linear intersecting members 32, 33, a pair of vertical members 34, 35 and a bail 36. The base can have feet for spacing it from the bottom 27 surface of pot 12. Each vertical member 34, 35 has a hook 37, 38 respectively for connecting to the ends 39, 40 of bail 36, as shown in FIG. 2. Bail 36 can be trapezoidal in shape, having handle portion 51, sides 52, 53 and cross beam 54. The enlarged handle 51 enables a user to grip with both hands.

Steamer plate 41 can optionally be placed upon basket 14 if food items are to be steamed. Plate 41 has a generally circular shape, providing peripheral edge 42 and central opening 43. Plate 41 is preferably perforated providing an array of openings therethrough that enable steam to access all surfaces of a food item that is placed on the upper surface 45 of plate 41. Drippings from food items can flow through the openings as well.

Support 46 extends upwardly from base 31 of basket 14. Support 46 has a dual function of holding steamer plate 41 as shown in FIGS. 2 and 7 of supporting a food item such as chicken, turkey or other selected item as shown in FIG. 8.

A pair of laterally extending posts 47, 48 support the peripheral edge 42 of steamer plate 41 when the steamer plate is assembled to the basket 14. Central opening 43 of steamer plate 41 rests upon support 46 when the steamer plate is put in an operational position. The steamer plate is thus supported at its periphery with posts 47, 48 and at its center with support 46. Steamer plate 41 has peripheral slots at 49, 50 that fit vertical members 34, 35 respectively.

The apparatus of the present invention thus provides a dual function cooking apparatus that enables a user to either steam food products such as crabs, lobsters, clams and the like, or boil food items such as fish, shellfish, or poultry items.

Parts List

The following is a list of suitable parts and materials for the various elements of the preferred embodiment of the present invention.

| Part Number | Description |
|---|---|
| 10 | apparatus |
| 11 | burner |
| 12 | pot |
| 13 | supply valve |
| 14 | basket |
| 15 | interior |
| 16 | lower ring |
| 17 | upper ring |
| 18 | strut |
| 19 | lower strut section |
| 20 | upper strut section |
| 21 | center strut section |
| 22 | wind guard |
| 23 | lower end |
| 24 | upper linear section |
| 25 | lower linear section |
| 26 | bend |
| 27 | bottom surface |
| 28 | pot sidewall |
| 29 | inside diameter |
| 30 | outside diameter |
| 31 | base |
| 32 | intersecting member |
| 33 | intersecting member |
| 34 | vertical member |
| 35 | vertical member |
| 36 | bail |
| 37 | hook |
| 38 | hook |
| 39 | end |
| 40 | end |
| 41 | steamer plate |
| 42 | peripheral edge |
| 43 | central opening |
| 44 | openings |
| 45 | upper surface |
| 46 | support |
| 47 | horizontal post |
| 48 | horizontal post |
| 49 | slot |
| 50 | slot |
| 51 | handle portion |
| 52 | side |
| 53 | side |
| 54 | transverse beam |

The foregoing embodiments are presented by way of example only; the scope of the present invention is to be limited only by the following claims.

I claim:

1. A cooking apparatus, comprising:
   a) a burner having a frame that includes a base for engaging an underlying support surface, the frame burner having a jet for generating a high intensity flame for use in cooking, a supply hose for supplying propane to the jet, the burner frame having a support surface for cradling a pot;
   b) a pot that includes a generally flat bottom portion and a generally cylindrically shaped continuous sidewall, the pot having a generally cylindrically shaped interior;
   c) a liner that fits inside the pot for holding food articles to be cooked;
   d) the burner frame including an upper ring that is supported above the bottom of the pot, the upper ring being supported by a plurality of generally "ell" shaped struts that include first and second strut portions defining an angle of about ninety degrees, the first strut portion extending from the ring downwardly along a generally vertical path and the second strut portion extending horizontally to provide a horizontal surface that can cradle the bottom of the pot; and
   e) wherein the combination of the ell shaped struts and upper ring forming a lateral restraint to the pot for preventing tilting or lateral movement of the pot such as when the liner is inserted into or removed from the pot.

2. The cooking apparatus of claim 1 wherein the base is a circular ring portion of the frame.

3. The cooking apparatus of claim 1 wherein the burner frame includes an upper ring, a lower ring and a plurality of struts connecting the upper and lower rings, each strut including an inclined section.

4. The cooking apparatus of claim 1 wherein the burner frame includes an upper ring, a lower ring and a plurality of struts connecting the upper and lower rings, each strut including said first and second strut portions.

5. The cooking apparatus of claim 1 wherein the burner frame includes an upper ring, a lower ring and a plurality of struts connecting the said rings, each strut including said horizontal strut portion and said vertical strut portion.

6. The cooking apparatus of claim 4 wherein there are at least three circumferentially spaced apart struts.

7. The cooking apparatus of claim 1 further comprising a basket that fits inside the pot interior, the basket having a base the registers against the bottom of the pot, a vertically extending portion and a bail that can removably attach to the basket at the periphery of the pot.

8. The cooking apparatus of claim 7 wherein the bail has a horizontally extending portion that is sufficiently wide that a user can grip the horizontally extended section with two hands.

9. The cooking apparatus of claim 8 wherein the horizontally extended section is between about seven and fourteen inches (7"–14 ") in length.

10. A cooking apparatus, comprising:
   a) a burner frame having a base for engaging an underlying support surface, the burner having tubular sleeve with a nozzle therein for generating a high intensity flame for use in cooking, a supply hose for supplying propane to the burner, the burner having a support surface for cradling a pot;
   b) a pot that includes a generally flat bottom portion and a generally cylindrically shaped continuous sidewall, the pot having a generally cylindrically shaped interior;
   c) a basket liner that fits inside the pot interior, the basket having a base that registers next to the bottom of the pot, a vertically extending portion and a bail that is attached to the basket during use; and
   d) the burner frame including an upper ring member that is supported above the bottom of the pot, the upper ring being supported by a plurality of generally "ell" shaped struts; each strut formed of vertical and horizontal strut portions that form and angle of about ninety degrees, each vertical strut portion extending from the upper ring member downwardly along a generally vertical path and each horizontal strut portion extending horizontally, with horizontal strut portions positioned to cradle the bottom of the pot during use.

11. The cooking apparatus of claim 10 wherein the frame includes upper and lower circular rings.

12. The cooking apparatus of claim 10 wherein the burner frame includes an upper ring, a lower ring and a plurality of struts connecting the rings, each strut including an inclined section.

13. The cooking apparatus of claim 10 wherein the burner frame includes an upper ring, a lower ring and a plurality of struts connecting the rings, each strut including a horizontal section.

14. The cooking apparatus of claim 10 wherein the burner frame includes an upper ring, a lower ring and a plurality of struts connecting the rings, each strut including a horizontal section and a vertical section.

15. The cooking apparatus of claim 4 wherein there are at least three horizontal sections spaced circumferentially apart for cradling the pot.

\* \* \* \* \*